(12) United States Patent
Ragab et al.

(10) Patent No.: US 12,523,542 B2
(45) Date of Patent: Jan. 13, 2026

(54) METHOD AND APPARATUS FOR PRECISION TEMPERATURE SENSING

(71) Applicant: Avago Technologies International Sales Pte. Limited, Singapore (SG)

(72) Inventors: Kareem Abdelghani Ibraheem Mohamed Ragab, Irvine, CA (US); Xiaofeng Lin, Irvine, CA (US); Darwin Cheung, Irvine, CA (US); Chi Mo, Irvine, CA (US); Vinay Chandrasekhar, Irvine, CA (US); Jungwoo Song, Irvine, CA (US); Xicheng Jiang, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 418 days.

(21) Appl. No.: 18/117,352

(22) Filed: Mar. 3, 2023

(65) Prior Publication Data
US 2024/0295444 A1   Sep. 5, 2024

(51) Int. Cl.
G01K 7/16   (2006.01)

(52) U.S. Cl.
CPC ........... *G01K 7/16* (2013.01); *G01K 2219/00* (2013.01)

(58) Field of Classification Search
CPC ........................................................ G01K 7/16
USPC ............................................................ 327/512
See application file for complete search history.

(56) References Cited

U.S. PATENT DOCUMENTS

| 9,182,295 B1 | 11/2015 | Perrott et al. |
| 2015/0285691 A1 | 10/2015 | Caffee et al. |
| 2019/0204253 A1* | 7/2019 | Yoo .......................... G01K 7/24 |

OTHER PUBLICATIONS

European Search Report on non-Foley case related to U.S. Appl. No. 18/117,352 DTD Jul. 12, 2024.

* cited by examiner

*Primary Examiner* — Tomi Skibinski
(74) *Attorney, Agent, or Firm* — Foley & Lardner LLP

(57) ABSTRACT

An apparatus includes a switched-capacitor resistor that provides an equivalent resistance that can be used as a reference resistor. The switched-capacitor resistor includes a capacitor and a pair of switches that alternately switch (e.g., open and close) in order to charge and discharge the capacitor. The switching frequency of the switches can be controlled by a clock phase generator that generates non-overlapping pulses. To further control the frequency, a frequency locked loop circuit can also be used.

18 Claims, 4 Drawing Sheets

METHOD AND APPARATUS FOR PRECISION TEMPERATURE SENSING

TECHNICAL FIELD

This application is directed to temperature sensing circuits, and more particularly, temperature sensing circuits with an integrated switched capacitor resistor.

BACKGROUND

Temperature sensing circuits may include a thermistor and a reference resistor used as a comparison for the thermistor. The reference resistor may contribute to better accuracy when measuring temperature. In some instances, however, the reference resistor is susceptible to issues such as temperature drift, aging, and package strain.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

This application is directed to integrating a switched capacitor resistor with a temperature sensing circuit. Switched capacitor resistors described herein may include an electronic circuit designed to transfer charges in and out of a capacitor by alternately opening and closing a pair of switches. The switches may include electronic switches that are controlled by a discrete time signal processing system designed to transmit non-overlapping signals in the form of non-overlapping clock pulses in which a first pulse causes a first switch to close and a second switch to open, and a second pulse (non-overlapping with the first pulse) causes the second switch to close and the first switch to open. In this manner, the transfer of charges in and out of the capacitor provides an equivalent resistance for the temperature sensing circuit.

The switched capacitor can replace a reference resistor in the temperature sensing circuit. Reference resistors used in thermometry applications may be used as a standard or highly accurate resistor component. In some instances, a reference resistor is susceptible to issues that cause, for example, a quantity (e.g., across the reference resistor) to change over time even when the same quantity is provided. Such issues may be caused by temperature drift, aging, and/or package strain. Additionally, any tolerances in the resistor (allowed by the manufacturing of the resistor) may cause the specified electrical resistance to vary from the actual electrical resistance, which can lead to additional errors in temperature sensing.

Beneficially, substitution of a reference resistor with a switched capacitor can reduce or eliminate these issues. For example, a capacitor used in the switched capacitor resistor is less susceptible to temperature drift and aging.

These and other embodiments are discussed below with reference to FIGS. 1-4. However, those skilled in the art will readily appreciate that the detailed description given herein with respect to these Figures is for explanatory purposes only and should not be construed as limiting.

Figure 1:
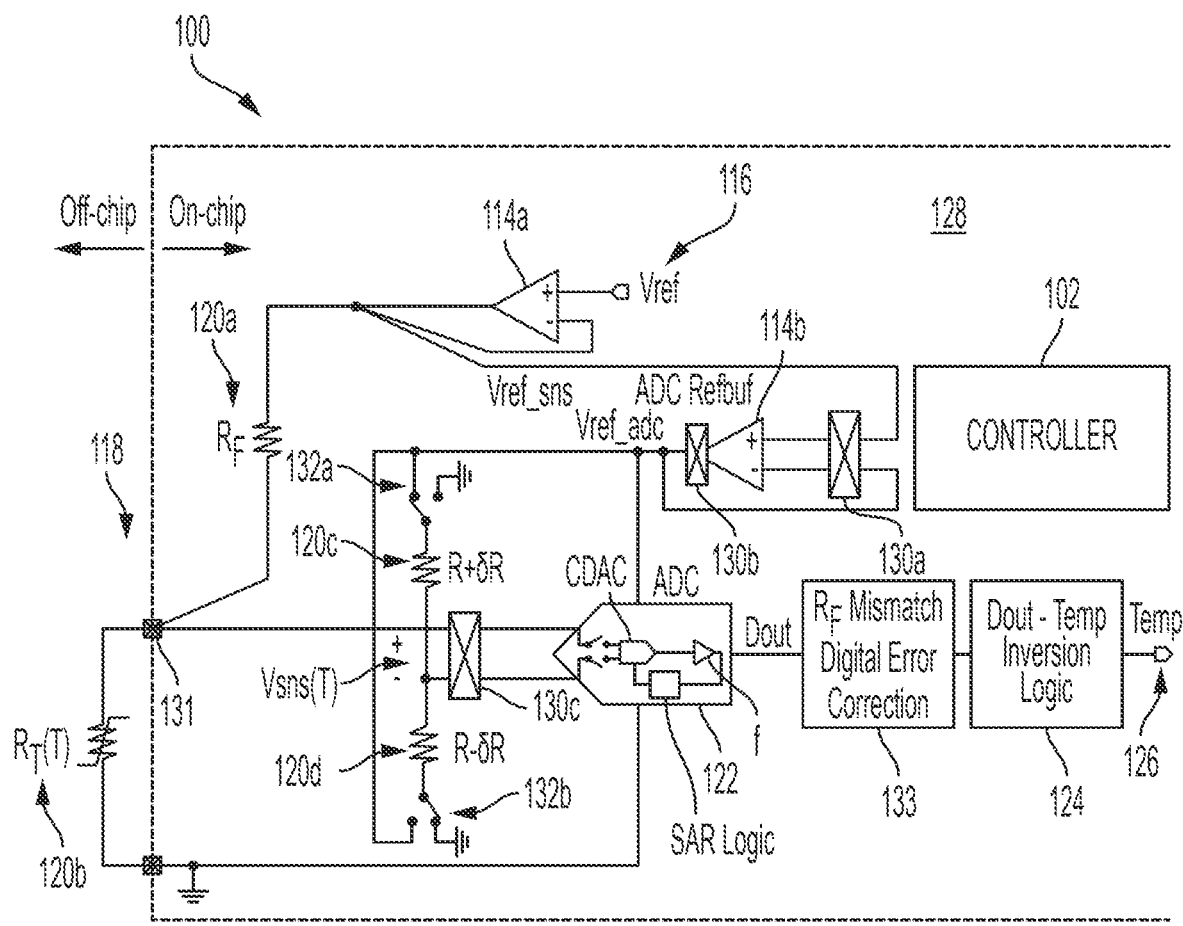
FIG. 1 illustrates an embodiment of a circuit diagram of an apparatus for temperature sensing, according to one approach.

According to some embodiments, for example as shown in FIG. 1, an apparatus 100 is shown. In some embodiments, the apparatus 100 is a temperature sensing circuit. The apparatus 100 may include an amplifier 114a used as a reference buffer for a reference voltage 116 ($V_{ref}$). The output voltage ($V_{ref\_sns}$) passes through a resistor assembly 118, which may take the form of a resistor divider. The resistor assembly 118 includes a resistor 120a ($R_F$), a resistor 120b ($R_T(T)$) forming a resistor divider. Thus, the resistors 120a and 120b are designed to sense the voltage $V_{ref\_sns}$. In some embodiments, the resistor 120a includes a reference resistor (e.g., poly resistor) and the resistor 120b includes a temperature-dependent resistor (e.g., thermistor, resistant thermometer) designed to respond to a temperature change with a measurable change in resistance (e.g., electrical resistance). Accordingly, when the resistor 120b is used a temperature-dependent resistor, the voltage $V_{sns}(T)$ (a voltage dependent upon the temperature T) is a fraction of the input voltage to the resistor assembly 118, and is the voltage measured across the resistor 120b. Put another way, the voltage $V_{sns}(T)$ changes based on changes in resistance of the resistor 120b. For example, when the temperature increases, the electrical resistance of the resistor 120b decreases, and the voltage $V_{sns}(T)$ decreases. In this regard, the voltage $V_{sns}(T)$ is a resistor voltage representing a temperature-dependent voltage that can be used to determine temperature.

The resistor assembly 118 further includes a resistor 120c (R+δR), and a resistor 120d (R−δR). In some embodiments, the resistors 120c and 120d are used to balance (e.g., find a balanced voltage output) of the resistor assembly 118. In this regard, the resistors assembly 118 can form a resistor bridge. As shown, the resistors 120c and 120d have an undesired electrical resistance difference equal to 2δ.

The apparatus 100 further includes an analog-to-digital converter (ADC) 122. Referring to the voltage $V_{sns}(T)$, the analog current, based on the voltage $V_{sns}(T)$, is provided to the ADC 122, which generates a digital output $D_{out}$ based on the analog voltage. When the ADC 122 takes the form of a SAR ADC, the ADC 122 may include a capacitive digital-to-analog converter (CDAC) with n capacitors (each having binary weighted values), a comparator that compares two voltages, and SAR logic that determines a digital output based on the voltage comparison at the comparator. As an example, the n capacitors of the CDAC may include a capacitor with a capacitance C used as the least significant bit (LSB), with each capacitor successively increasing by 2× (or two times) up to the most significant bit (MSB). Through an acquisition phase, the ADC 122 receives the voltage $V_{sns}(T)$ and applies the voltage $V_{sns}(T)$ to the n capacitors. Once the voltage across the n capacitors is sampled, a voltage V at the comparator is measured. Then, during a conversion phase, the comparator compares the voltage V to the reference voltage ($V_{ref,adc}$), when applied first to capacitor corresponding to the MSB, and the SAR logic generates a bit decision (e.g., binary value 0 or 1). When the comparator indicates the voltage across the capacitor (based on the reference voltage scaled by the CDAC weight) is less than the voltage V, the SAR logic generates a bit decision 1, and the capacitor remains connected to $V_{ref,adc}$. When the comparator indicates the voltage across the capacitor (based on the reference voltage scaled by the CDAC weight) is greater than the voltage V, the SAR logic generates a bit decision 0, and the capacitor connects to ground. After the MSB capacitor, the process is successively applied to each capacitor from the next MSB capacitor (e.g., MSB-1) to the LSB. For n capacitors, the ADC 122 will generate an n-bit digital output, which corresponds to $D_{out}$ in FIG. 1. The apparatus 100 further includes a logic circuit 124 designed to convert the digital output $D_{out}$ into a temperature 126. Although not shown, the CDAC may include a segmented CDAC designed to provide additional error correction.

Additionally, the amplifier 114a acts as a voltage source and provides the output voltage $V_{ref\_sns}$ as a reference voltage at an input to an amplifier 114b of the apparatus 100. The amplifier 114b can act as a voltage source and provide the voltage as a reference voltage to the ADC 122. As a result, the voltage at the resistor assembly 118 and the ADC 122 share the same reference voltage. Beneficially, the reference voltage $V_{ref\_sns}$ across the resistor 120b is the same as the reference voltage $V_{ref,adc}$ provided to the ADC 122, and the voltage $V_{sns}(T)$ sensed across the resistor 120b is not sensitive to variations caused by different reference voltages. For example, normally the voltage $V_{sns}(T)$ sensed across the resistor 120b is proportional to the input voltage $V_{ref\_sns}$, and is a ratio of the electrical resistance of the resistor 120b divided by the total electrical resistance of the resistors 120a and 120b based on the equation:

$$V_{sns}(T) = \left(\frac{R_T(T)}{R_F + R_T(T)}\right) * V_{ref\_sns}$$

However, the same voltage $V_{ref\_sns}$ is also provided from the amplifier 114b and compensates (e.g., cancels with) the voltage $V_{ref\_sns}$ (in the above equation) provided by the amplifier 114a, as the value of the voltage $V_{ref\_sns}$ appears across the resistors 120a and 120b, and $V_{ref\_adc}$ is the same value as $V_{ref\_sns}$. In this manner, the voltage $V_{ref\_sns}$ effectively appears at a node 131 after passing through each of the amplifiers 114a and 114b. As a result, the digital output $D_{out}$ from the ADC 122 is no longer dependent upon the voltage $V_{ref\_sns}$. Beneficially, using the same reference voltage through amplifiers 114a and 114b can eliminate at least some errors in the voltage $V_{sns}(T)$, and the logic circuit 124 of the apparatus 100 designed to convert the digital output $D_{out}$ into the temperature 126 may provide enhanced accuracy for the temperature 126.

Also, in order to compensate for voltage offsets, the apparatus 100 may include additional modifications used in error averaging. For example, the apparatus 100 includes a switch 130a and a switch 130b at an input and an output, respectively, of the amplifier 114b. In some embodiments, the each of the switches 130a and 130b is a chopping switch (also referred to as a tuning switch) designed to change the polarity of the voltage. In this regard, a sampling operation can be used to compensate for the voltage offset at the amplifier 114b ($V_{os,refadc}$). For example, a controller 102 of the apparatus 100 is used to take a first sample that includes the voltage offset $V_{os,refadc}$ with a positive polarity. Then the switch 130a can reverse the polarity and the controller 102 takes a second sample. The controller 102 can calculate the average of the first and second samples. Here, the average offset is zero, or close to zero, as the magnitude of the measured offset voltages is the same but with an opposite polarity. This sampling operation may occur at various times to compensate for aging of the apparatus 100, packaging strain to the apparatus 100, and/or temperature changes to one or more components (other than the resistor 120b).

Additionally, the controller 102 can perform a sampling operation to compensate for resistor mismatch, and in particular, the mismatch δ value between the resistors 120c and 120d. The apparatus 100 includes a switch 132a and a switch 132b in series with the resistor 120c and the resistor 120d, respectively. During a first sample, the controller 102 closes the switch 132a and opens the switch 132b, and the voltage across the resistor 120c is obtained (e.g., measured). Then the switch 130b can reverse the polarity and a second sample is taken. During the second sample, the controller 102 opens the switch 132a and closes the switch 132b, and the voltage across the resistor 120d is obtained. The controller 102 calculates the average error to be zero, or close to zero, as the magnitude of the measured error voltages is the same but with opposite polarity. Beneficially, differences due to the δ value between the resistors 120c and 120d can be compensated for. Additionally, the apparatus 100 includes a switch 130c, which can take any form described for the switches 130a and 130b. The switch 130c can be used in a similar manner (e.g., sample, polarity reverse, sample) to compensate for the offset voltage at an input of the ADC 122 ($V_{os,adc}$). Digital chopping implements the same function as the analog switch (e.g. polarity reversal) but in the digital domain.

Further, as shown, in FIG. 1, the apparatus 100 include several on-chip components (e.g., amplifiers 114a and 114b, ADC 122) that are physically located on a substrate 128 of the apparatus 100. In some embodiments, the substrate 128 includes an integrated circuit, a chip, or a die. Some components of the apparatus 100 include components located on the substrate 128. An "on-chip" component refers to a component that is physically located on the substrate 128. Conversely, an "off-chip" component (e.g., resistors 120a and 120b) refers to a component that is not physically located on the substrate 128, e.g., a component that is physically off of the substrate 128, and physically on, for example, another substrate separate from the substrate 128. As shown, resistor 120b (representing off-chip component) is not physically located on the substrate 128, but is nonetheless coupled to (e.g., connected, including electrically connected) to components on the substrate 128. Moreover, the resistors 120a, 120c, and 120d (representing on-chip components) form set of resistors that are physically located on the substrate 128.

While the apparatus 100 can be used to determined temperature, there are some possible drawbacks. For example, the resistor 120a used as a reference resistor, and thus, is designed as a comparison standard in the apparatus 100. However, the resistor 120a may be susceptible issues such as temperature drift, aging, and package strain on the apparatus 100. The apparatus 100 may include an error correction circuit 133 (RF mismatch digital error correction) implemented during an automated test equipment (ATE) operation. The error correction circuit 133 may compensate for issues related to the resistor 120a (e.g., manufacturing tolerances) or other issues in the apparatus 100. However, compensation provided by the error correction circuit 133 cause the apparatus 100 to be initially accurate and reliable at, for example time t=0, but as time passes, the accuracy and reliability may reduce, and repeated use of the error correction circuit 133 in the ATE operation is required.

Figure 2:
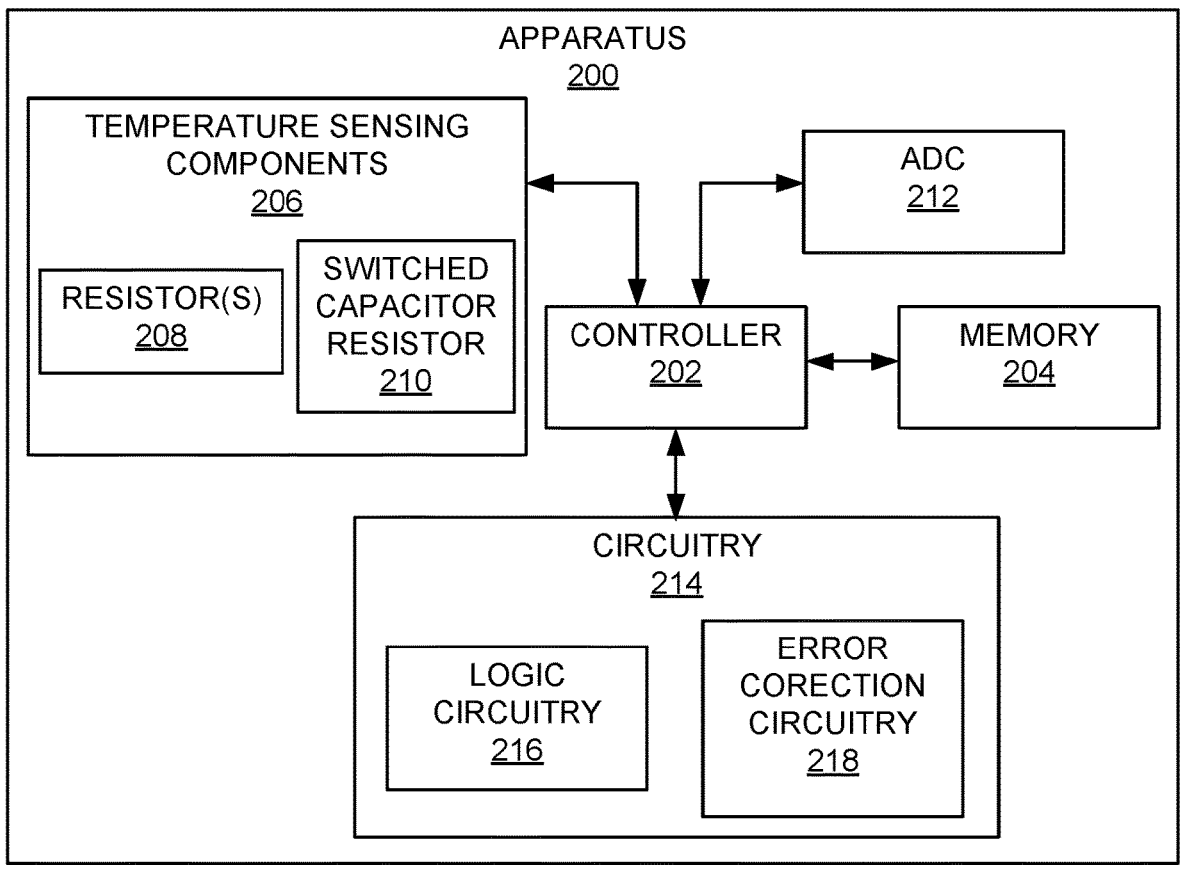
FIG. 2 illustrates a block diagram of an apparatus, in accordance with aspects of the present disclosure.

Referring to FIG. 2, a block diagram of an apparatus 200 is shown. In some embodiments, the apparatus 200 takes the form of an integrated circuit with various components shown and described herein. Also, the apparatus 200 can take the form of a temperature sensing circuit.

As shown, the apparatus 200 includes a controller 202. The controller 202 may include a microcontroller, an application-specific controller, or a combination thereof. The apparatus 200 may further include a memory 204 coupled to the controller 202. The memory 204 stores executable instructions and algorithms used by the controller 202 to implement various functions of the apparatus 200 shown and described herein.

The apparatus 200 may further include temperature sensing components 206. In some embodiments, the temperature sensing components 206 may include one or more resistors 208, with at least one of the resistors being a temperature-dependents resistor (e.g., thermistor) in which the resistance (e.g., electrical resistance) changes by a measurable value based upon a change in temperature of the temperature-dependent resistor. Additionally, the temperature sensing components 206 may include a switched capacitor resistor 210. The switched capacitor resistor 210 may include a capacitor designed to transfer charges in and out of a capacitor by alternately opening and closing a pair of switches (e.g., electronic switches) controlled by a discrete time signal processing system designed to transmit non-overlapping signals (e.g., non-overlapping clock pulses). In this manner, the switched capacitor resistor 210 can provide an equivalent resistance for the apparatus 200.

The apparatus 200 may further include an ADC 212. In some embodiments, the ADC 212 includes a successive approximation register (SAR) ADC. The ADC 212 is designed to receive an analog signal from the temperature sensing components 206 and convert the analog signal into a digital signal. The analog signal from the temperature sensing components 206 varies in accordance with the change in resistance of the temperature sensing components 206. Accordingly, a change (e.g., increase or decrease) in temperature, as determined by the temperature sensing components 206, corresponds to a change (e.g., increase or decrease, respectively) in the analog signal.

The apparatus 200 may further include circuitry 214. The circuitry 214 may include logic circuitry 216 designed to convert the output (e.g., digital signal) from the ADC 212 into a temperature. As a non-limiting example, the logic circuitry 216 may include inversion logic with one or more logic gates used to transform a digital signal into a temperature value (e.g., in degrees Celsius or Fahrenheit). Alternatively, the logic circuitry 216 may be used to carry out steps in an algorithm to convert a digital input into a temperature. Additionally, the circuitry 214 may include error correction circuitry 218 designed to correct issues (e.g., tolerances issues) of a capacitor of the switched capacitor resistor 210. For example, during an ATE operation, the capacitance, or ability to hold charge, of the capacitor is measured and checked for mismatch (e.g., differenced between actual and specified capacitance). The ATE operation can provide corrective action to compensate the mismatch. Beneficially, the capacitor is less susceptible to issues, as compared to resistors, and as a result, the correction provided by the ATE operation is relatively more sustainable as compared to corrective action provided based on resistor tolerances. The logic circuitry 216 and the error correction circuitry 218 may be implemented in hardware or software.

Figure 3:
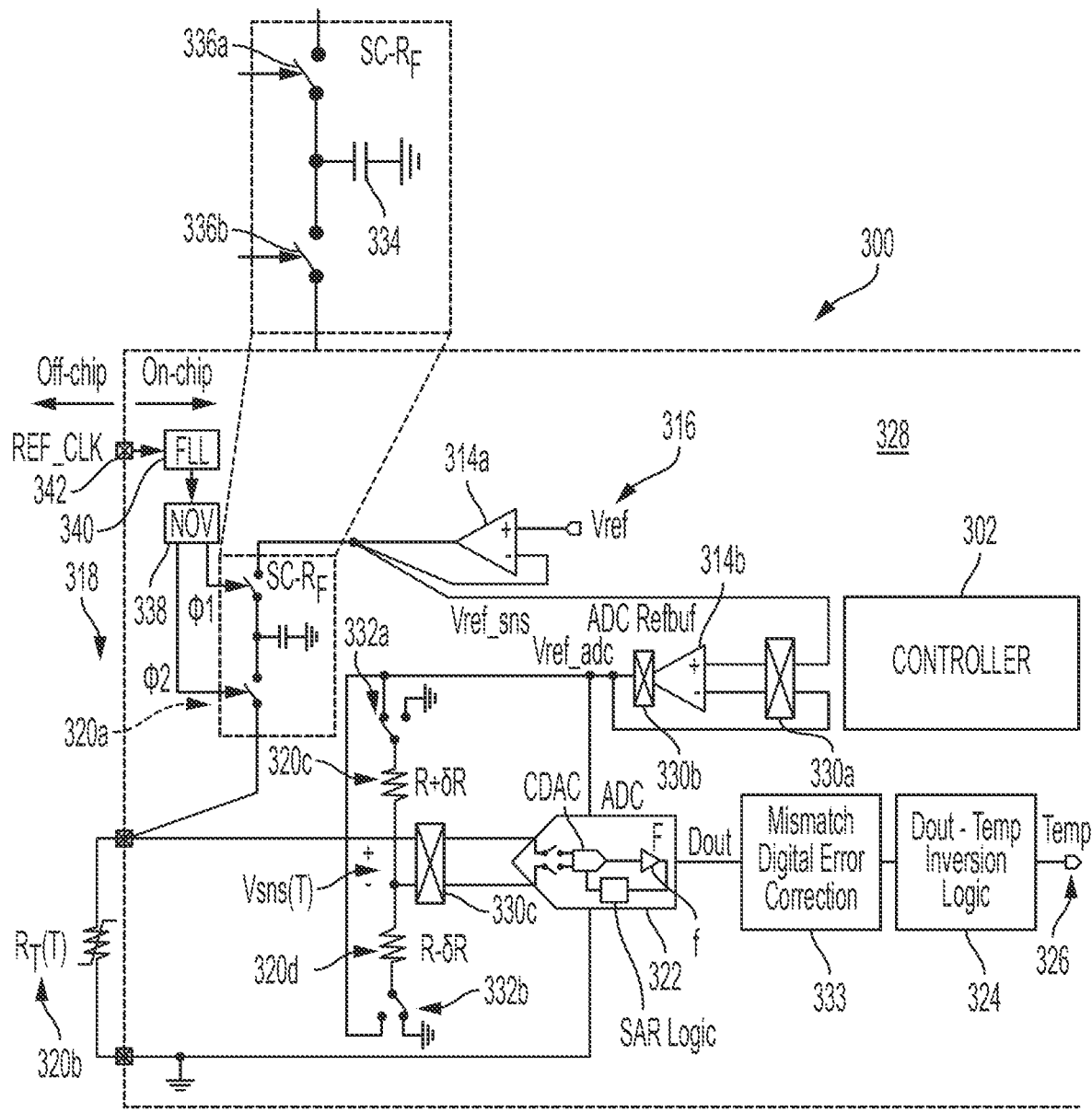
FIG. 3 illustrates an embodiment of circuit diagram an apparatus for temperature sensing, in accordance with aspects of the present disclosure.

FIG. 3 illustrates an embodiment of circuit diagram an apparatus 300 for temperature sensing, in accordance with aspects of the present disclosure. The apparatus 300 may include several components shown and described for the apparatus 100 (shown in FIG. 1). Although not expressly described for the apparatus 300, the components of the apparatus 300 that are similarly present in the apparatus 100 (shown in FIG. 1) may function in a manner similar to those shown and described for the apparatus 100.

As shown, the apparatus 300 includes a controller 302 designed to control the various functions (e.g., temperature detection) of the apparatus 300. The apparatus 300 further includes an amplifier 314a used as a reference buffer for a reference voltage 316 ($V_{ref}$). The output voltage ($V_{ref\_sns}$) passes through an assembly 318, which may take the form of a resistor divider. The assembly 318 includes a switched capacitor resistor 320a (SC_$R_F$) and a resistor 120b ($R_T(T)$) that form a resistor divider. The assembly 318 further includes a resistor 320c (R+δR), and a resistor 320d (R−δR).

The apparatus 300 further includes an amplifier 314b that received an input voltage from the amplifier 314a and outputs a voltage to an ADC 322, which can be used as a reference voltage by the ADC 322. The ADC 322 can receive an input voltage across the resistor 320b and generate a digital output $D_{out}$. The apparatus 300 further includes a logic circuit 324 designed to convert the digital output $D_{out}$ into a temperature 326. Several switches, such as a switch 330a, a switch 330b, a switch 332a, and a switch 332b, may perform similar functions as those described for the switch 130a, the switch 130b, the switch 132a, and the switch 132b, respectively (shown in FIG. 1).

The switched capacitor resistor 320a is designed to provide an electrical resistance without using an actual resistor. The switched capacitor resistor 320a may provide a reference resistor with a more accurate, reliable, and repeatable electrical resistance as compared to an actual resistor. As shown in the enlarged view, the switched capacitor resistor 320a includes a capacitor 334, a switch 336a, and a switch 336b. When the switch 336a is closed and the switch 336b is open, the capacitor 334 is charged by the output voltage from the amplifier 314a. Accordingly, the amplifier 314a can act as a voltage source for the capacitor 334. Conversely, when the switch 336b is open and the switch 336a is closed, the capacitor 334 discharges, and voltage based on the discharge is sensed by components, such as the resistor 320b and the ADC 322. By alternately opening and closing the switches 336a and 336b, the capacitor 334 transfer charges in and out, thereby creating an equivalent resistance for the apparatus 300.

In some embodiments, each of the switches 336a and 336b is an electronic switch. In this regard, the apparatus 300 may further include a generator circuit 338 designed to generate clock pulses (e.g., non-overlapping clock pulses ø1 and 2). In some embodiments, the generator circuit 338 is an electronic oscillator used to produce one or more clock signals for synchronization. In this regard, in some embodiments, the generator circuit 338 is a clock phase generator circuit. The generator circuit 338 may include a non-overlapping clock phase generator (NOV) designed to generate two signals that are substantially non-overlapping clock pulses. For example, during operation of the generator circuit 338 generating two signals, a high state of the first signal (causing the switch 336a to close) and a low state of the second signal (causing the switch 336b to open) may occur, thereby causing the capacitor 334 to charge. At a later time, a low state of the first signal (causing the switch 336a to open) and a high state of the second signal (causing the switch 336b to close) may occur, thereby discharging the capacitor 334. While the non-overlapping clock pulses are substantially non-overlapping, the clock pulses may partially overlap. This will be shown and described in further detail below.

In addition to the generator circuit 338, the apparatus 300 further includes a frequency locked loop 340 (FLL) used to control the switching frequency of the switches 336a and 336b. The frequency locked loop 340 may provide higher switching frequency (e.g., megahertz or MHz), as compared to that of the generator circuit 338. Also, the apparatus 300 may further include a reference clock 342 (REF_CLK) designed to provide reference pulses with precision. In some embodiments, the reference clock 342 is a digital circuit that generates an electronic logic signal that oscillates between a high and low state at a constant frequency. The reference clock 342 may generate signals based on a crystal oscillator to ensure accuracy and repeatability. In some embodiments, the frequency locked loop 340 is an electronic control system that generates a signal that is locked to the reference clock 342 and is locked to the frequency of the pulses provided by the reference clock 342. The equivalent resistance $R_{equiv}$ provided by the switched capacitor resistor 320a can be expressed as $$R_{equiv} = \frac{1}{Cf}$$

where C is the capacitance (in Farads) and f is the switching frequency of the switches (e.g., switches 336a and 336b).

In some embodiments, the switched capacitor resistor 320a and the resistor 320b are part of a resistor divider. Also, as shown in FIG. 3, the switched capacitor resistor 320a is an on-chip component that is physically on a substrate 328 (e.g., integrated circuit, chip) of the apparatus 300, and the resistor 320b is an off-chip component that is not physically on the substrate 328. Although not expressly shown, the resistor 320b may be located on a substrate other than the substrate 328.

The apparatus 300 further includes an error detection circuit 333 (Mismatch digital error correction) designed to correct errors, such as capacitor mismatch errors of the capacitor 334. The error detection circuit 333 may be used during an ATE operation used to compensate the capacitor mismatch. Beneficially, once the capacitor mismatch is compensated, the capacitor 334 is less susceptible to issues (e.g., drift, aging) as compared to resistors, and the ATE operation need not be performed at a later time. By compensating for capacitor mismatch of the capacitor 334, the contribution to electrical resistance by the capacitor 334 is generally set, and if desired, the switching frequency may be used to adjust the electrical resistance of the switched capacitor resistor 320a.

Figure 4:
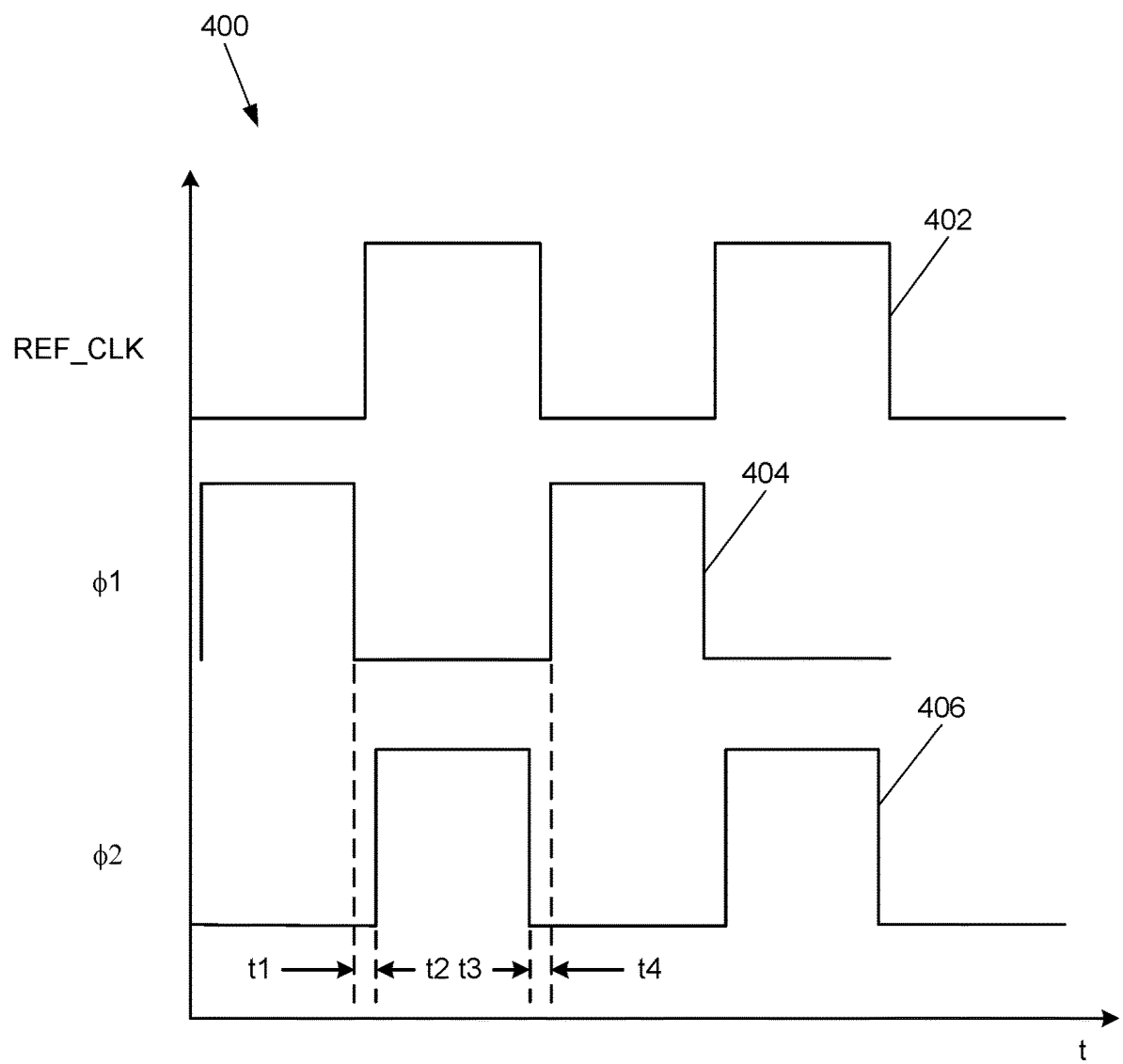
FIG. 4 illustrates a chart showing plots of a reference clock and two phases used to control switches, in accordance with aspects of the present disclosure.

FIG. 4 illustrates a chart 400 showing plots of a reference clock and two phases used to control switches, in accordance with aspects of the present disclosure. As shown, a plot 402 represents a signal a reference clock (REF_CLK), a plot 404 represents signal of a phase (ϕ1) used to control a switch (e.g., switch 336a shown in FIG. 3), and represents signal of a phase (ϕ2) used to control a switch (e.g., switch 336b shown in FIG. 3). Each of the plots 402, 404, and 406 illustrates pulses, and accordingly, the plots 402, 404, and 406 show respective high and low states, with the high states of the plots 404 and 406 providing in part a command to close a respective switch, and the low states of the plots 404 and 406 providing in part a command to open a respective switch. Also, the plots 402, 404, and 406 may be generated by a clock phase generator circuit and a frequency locked loop circuit, as non-limiting examples.

The plot 402 may be used as a reference for the plots 404 and 406. As shown, when the plot 402 is at a low state, the plot 404 is at a high state (corresponding to a switch being closed) and the plot 406 is at a low state (corresponding to a switch being open). The plots 404 and 406 are out of phase with each other, and accordingly, for a switched capacitor resistor, when one switch is closed, the other switch is open, and vice versa. Moreover, to ensure that only one switch is closed at a time, the plots 404 and 406 include some overlap. For example, from time t1 to time t2, the plots 404 and 406 include some overlap in a low state, and from t1 to t2, both switches of a switched capacitor resistor are open. Similarly, from time t3 to time t4, the plots 404 and 406 include some overlap in a low state, and from t3 to t4, both switches of a switched capacitor resistor are also open. However, the respective pulses of the plots 404 and 406 are non-overlapping for a majority of time, and the overlap represents a minority of time. For example, while the plot 404 is in a low state, the plot 406 will be in a high state for a shorter duration as compared to that of the plot 406 being in a low state (e.g., when overlap occurs). Similarly, while the plot 406 is in a high state, the plot 404 will be in a low state for a longer duration as compared to that of the plot 404 being in a high state (e.g., when overlap occurs). Accordingly, the plots 404 and 406 can be characterized as being at least partially non-overlapping and at least partially overlapping. Also, based on this relationship, each of the plots 404 and 406 provide a clock signal with a duty cycle of less than 50%. Beneficially, the switches are effectively never both closed at the same time, thus reducing charging errors when charging a capacitor of the switched capacitor resistor.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation.

Likewise, a processor configured to execute code can be construed as a processor programmed to execute code or operable to execute code.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An apparatus, comprising:
   a first resistor comprising a resistance configured to change based on a temperature change of the first resistor;
   a first switch controlled by a first pulse;
   a second switch controlled by a second pulse; and
   a capacitor, wherein:
      in response to the first switch closing, the second switch is configured to open and the capacitor is configured to charge,
      in response to the second switch closing, the first switch is configured to open and the capacitor is configured to discharge, and
      in response to the capacitor charging and discharging, the capacitor is configured to provide a reference resistor for the apparatus; and
      wherein the first pulse is non-overlapping with the second pulse such that only one of the first switch or the second switch is closed at a given time.

2. The apparatus of claim 1, further comprising a generator circuit configured to generate the first pulse and the second pulse.

3. The apparatus of claim 2, further comprising a frequency locked loop circuit coupled to the generator circuit, wherein the frequency locked loop circuit is further configured to generate the pulses.

4. The apparatus of claim 1, further comprising a voltage source configured to charge the capacitor in response to the first switch closing.

5. The apparatus of claim 1, further comprising an analog-to-digital converter (ADC) configured to:
   receive a voltage sensed across the first resistor, and
   generate a digital output based on the received voltage.

6. The apparatus of claim 5, wherein the digital output corresponds to a temperature.

7. The apparatus of claim 1, wherein:
   in response to a first clock signal, the first switch closes, and
   in response to a second clock signal, the second switch closes.

8. The apparatus of claim 7, wherein the first clock signal is at least partially non-overlapping with respect to the second clock signal.

9. A temperature sensing circuit, comprising:
   a resistor configured to provide a first resistance;
   a first switch;
   a second switch, wherein the first switch and the second switch are configured to alternately open and close based on a switching frequency;
   a capacitor; and
   a generator circuit configured to generate clock signals that are at least partially non-overlapping, each of the clock signals having a duty cycle such that only one of the first switch and the second switch is closed at a given time, wherein:
      the switching frequency of the first switch and the second switch is based on the clock signals, and
      the capacitor is configured to provide a second resistance based on the switching frequency.

10. The temperature sensing circuit of claim 9, wherein the first resistance is configured to change based on a temperature of the resistor.

11. The temperature sensing circuit of claim 9, further comprising an analog-to-digital converter (ADC) configured to:
receive a voltage sensed across the resistor, and
generate a digital output based on the received voltage.

12. The temperature sensing circuit of claim 11, further comprising a frequency locked loop circuit coupled to the generator circuit, wherein the frequency locked loop circuit is further configured to control the switching frequency.

13. The temperature sensing circuit of claim 9, wherein the clock signals comprise:
a first clock signal that includes a first duty cycle; and
a second clock signal that includes a second duty cycle, wherein each of the first duty cycle and the second duty cycle is less than 50%.

14. A temperature sensing circuit, comprising:
a voltage source;
a resistor coupled to the voltage source, the resistor configured to provide a first resistance based on a temperature at the resistor;
a capacitor configured to provide a second resistance based on a switching frequency of switches that control charging and discharging of the capacitor;
a generator circuit configured to provide first and second clock signals that are non-overlapping such that only one of the switches is closed at a given time, whereby the capacitor alternately charges and discharges to provide the second resistance; and
an analog-to-digital converter (ADC) configured to convert an analog signal from the resistor to a generate a digital output, wherein the digital output corresponds to the temperature.

15. The temperature sensing circuit of claim 14, further comprising a generator circuit configured to control the switching frequency.

16. The temperature sensing circuit of claim 15, further comprising a frequency locked loop circuit coupled to the generator circuit, wherein the frequency locked loop circuit is further configured to control the switching frequency.

17. The temperature sensing circuit of claim 15, wherein the switches are configured to alternately open and close based on pulses generated by the generator circuit.

18. The temperature sensing circuit of claim 17, wherein the pulses are at least partially non-overlapping.

\* \* \* \* \*